(12) United States Patent
Rose et al.

(10) Patent No.: US 7,913,791 B2
(45) Date of Patent: Mar. 29, 2011

(54) ENERGY STORAGE SYSTEM FOR A HYBRID VEHICLE

(75) Inventors: Kenric B. Rose, Howell, MI (US); Simon J. Baseley, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 12/435,175

(22) Filed: May 4, 2009

(65) Prior Publication Data

US 2010/0276221 A1    Nov. 4, 2010

(51) Int. Cl.
    *B60K 6/00* (2007.10)
(52) U.S. Cl. .................. 180/165; 180/65.31; 123/179.31
(58) Field of Classification Search ............... 180/65.21, 180/65.22, 65.31, 305, 306, 307, 165; 123/179.1, 123/179.31
See application file for complete search history.

(56) References Cited

U.S. PATENT DOCUMENTS

| | | | |
|---|---|---|---|
| 3,633,360 A | 1/1972 | Kelley | |
| 3,665,788 A | 5/1972 | Nyman | |
| 3,695,731 A | 10/1972 | England et al. | |
| 3,917,027 A | 11/1975 | Hakanson et al. | |
| 3,923,115 A * | 12/1975 | Helling | 180/65.25 |
| 4,064,694 A | 12/1977 | Baudoin | |
| 4,098,144 A | 7/1978 | Besel et al. | |
| 4,132,283 A | 1/1979 | McCurry | |
| 4,199,950 A | 4/1980 | Hakanson et al. | |
| 4,227,587 A | 10/1980 | Carman | |
| 4,235,216 A | 11/1980 | Miles | |
| 4,347,813 A | 9/1982 | Maucher et al. | |
| 4,350,220 A | 9/1982 | Carman | |
| 4,351,152 A | 9/1982 | Reynolds et al. | |
| 4,373,332 A | 2/1983 | Holmen | |
| 4,406,951 A | 9/1983 | Inoue | |
| 4,441,573 A | 4/1984 | Carman et al. | |
| 4,487,173 A | 12/1984 | Maucher et al. | |
| 4,534,169 A | 8/1985 | Hunt | |

(Continued)

FOREIGN PATENT DOCUMENTS

DE    102007012130    11/2007

(Continued)

OTHER PUBLICATIONS

Hewko, L. O. et al., "Hydraulic Energy Storage Based Hybrid Propulsion System For A Terrestrial Vehicle" research paper, Aug. 12, 1990, pp. 99-105.

(Continued)

*Primary Examiner* — J. Allen Shriver, II
*Assistant Examiner* — Jacob Meyer
(74) *Attorney, Agent, or Firm* — Michael Best & Friedrich LLP

(57) ABSTRACT

An energy storage system for a hybrid vehicle, with an internal combustion engine having an output shaft, includes a reservoir containing working fluid, a reversible pump/motor in fluid communication with the reservoir, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump. The energy storage system also includes an electric motor having a rotor selectively coupled to the output shaft to transfer torque to the output shaft. The reversible pump/motor is coupled to the rotor to transfer torque to the rotor when operating as a motor, and to receive torque from the rotor when operating as a pump.

22 Claims, 3 Drawing Sheets

U.S. PATENT DOCUMENTS

| | | | |
|---|---|---|---|
| 4,543,923 A | 10/1985 | Hamano et al. | |
| 4,580,534 A | 4/1986 | Blum et al. | |
| 4,741,410 A | 5/1988 | Tunmore | |
| 4,798,086 A | 1/1989 | Styfhoorn | |
| 4,813,510 A | 3/1989 | Lexen | |
| 5,048,355 A * | 9/1991 | Ueno | 74/7 A |
| 5,088,041 A | 2/1992 | Tanaka et al. | |
| 5,103,671 A | 4/1992 | Dyvig | |
| 5,152,142 A | 10/1992 | Budzich | |
| 5,310,017 A | 5/1994 | Tobias | |
| 5,404,717 A | 4/1995 | Nogi et al. | |
| 5,492,189 A | 2/1996 | Kriegler | |
| 5,507,144 A | 4/1996 | Gray, Jr. et al. | |
| 5,823,281 A | 10/1998 | Yamaguchi et al. | |
| 5,937,696 A * | 8/1999 | Ohya et al. | 74/7 A |
| 6,054,776 A | 4/2000 | Sumi | |
| 6,135,913 A | 10/2000 | Lyon | |
| 6,139,458 A | 10/2000 | Simmons | |
| 6,170,587 B1 | 1/2001 | Bullock | |
| 6,454,033 B1 | 9/2002 | Nathan et al. | |
| 6,460,332 B1 * | 10/2002 | Maruta et al. | 60/414 |
| 6,460,500 B1 * | 10/2002 | Ooyama et al. | 123/179.3 |
| 6,481,329 B2 | 11/2002 | Porter | |
| 6,543,311 B1 | 4/2003 | Baginski et al. | |
| 6,615,786 B2 * | 9/2003 | Mori et al. | 123/179.31 |
| 6,705,266 B2 * | 3/2004 | Tachikawa et al. | 123/179.3 |
| 6,712,166 B2 | 3/2004 | Rush et al. | |
| 6,719,080 B1 | 4/2004 | Gray, Jr. | |
| 6,736,099 B2 * | 5/2004 | Mori et al. | 123/179.31 |
| 6,834,737 B2 * | 12/2004 | Bloxham | 180/165 |
| 6,962,050 B2 | 11/2005 | Hiraki et al. | |
| 7,044,257 B2 | 5/2006 | Kempf et al. | |
| 7,086,226 B2 | 8/2006 | Oguri | |
| 7,117,836 B2 * | 10/2006 | Foster | 123/179.4 |
| 7,147,078 B2 | 12/2006 | Teslak et al. | |
| 7,273,122 B2 * | 9/2007 | Rose | 180/165 |
| 7,296,407 B2 | 11/2007 | Rose | |
| 7,357,105 B2 * | 4/2008 | Moriwaki et al. | 123/90.12 |
| 7,634,911 B2 * | 12/2009 | Brinkman | 60/414 |
| 7,649,286 B2 * | 1/2010 | Manning | 310/41 |
| 7,712,445 B2 * | 5/2010 | Ma et al. | 123/179.1 |
| 2002/0074175 A1 * | 6/2002 | Bloxham | 180/165 |
| 2002/0096885 A1 * | 7/2002 | Gomez et al. | 290/38 R |
| 2002/0166530 A1 * | 11/2002 | Tachikawa et al. | 123/179.3 |
| 2002/0166532 A1 * | 11/2002 | Mori et al. | 123/179.31 |
| 2003/0000492 A1 | 1/2003 | Mori et al. | |
| 2003/0103850 A1 | 6/2003 | Szulczewski | |
| 2003/0173133 A1 | 9/2003 | Kempt et al. | |
| 2005/0036894 A1 | 2/2005 | Oguri | |
| 2006/0053790 A1 * | 3/2006 | Foster | 60/629 |
| 2006/0068970 A1 * | 3/2006 | Rose | 477/34 |
| 2006/0079375 A1 | 4/2006 | Marshall et al. | |
| 2006/0157010 A1 | 7/2006 | Moriwaki et al. | |
| 2007/0018499 A1 | 1/2007 | Kokubo et al. | |
| 2007/0111849 A1 | 5/2007 | Ji | |
| 2008/0000746 A1 * | 1/2008 | Schiele et al. | 192/3.54 |
| 2008/0251302 A1 * | 10/2008 | Lynn et al. | 180/65.2 |
| 2009/0139788 A1 | 6/2009 | Miller | 180/165 |
| 2009/0270221 A1 * | 10/2009 | Kovach et al. | 477/3 |
| 2010/0126161 A1 * | 5/2010 | Rose | 60/414 |
| 2010/0186408 A1 * | 7/2010 | Rose et al. | 60/629 |
| 2010/0192563 A1 * | 8/2010 | Rose et al. | 60/415 |

FOREIGN PATENT DOCUMENTS

| | | |
|---|---|---|
| DE | 102007032316 | 1/2009 |
| FR | 2467095 | 4/1981 |
| JP | 61042247 | 2/1986 |
| JP | 01035102 | 2/1989 |
| JP | 3262726 | 11/1991 |
| WO | 00/02743 | 1/2000 |
| WO | 02/095243 | 11/2002 |
| WO | 2006055978 | 5/2006 |
| WO | 2007079642 | 7/2007 |
| WO | 2007/124882 | 11/2007 |
| WO | 2008/045468 | 4/2008 |

OTHER PUBLICATIONS

International Search Report and Written Opinion for PCT/US2010/033398, Jul. 16, 2010, 11 pages.

Spirax Sarco, "Isolation Valves—Rotary Movement," 14 pages, printed from web site www.spiraxsarco.com on Jun. 10, 2008.

Spirax Sarco, "Control Valve Actuators and Positioners," 23 pages, printed from web site www.spiraxsarco.com on Jun. 10, 2008.

Vanderwerp, Dave, "A Hybrid That Has No Batteries," Car and Driver Magazine, Feb. 2009, p. 24.

* cited by examiner

ENERGY STORAGE SYSTEM FOR A HYBRID VEHICLE

FIELD OF THE INVENTION

The present invention relates to hybrid drive systems for vehicles and more particularly to hybrid hydraulic drive systems for vehicles.

BACKGROUND OF THE INVENTION

A typical vehicle hybrid hydraulic drive system uses a reversible pump/motor to absorb power from and add power to or assist a conventional vehicle drive system. The system absorbs power by pumping hydraulic fluid from a low pressure reservoir into a hydraulic energy storage system. This hydraulic energy storage system typically includes one or more nitrogen-charged hydraulic accumulators. Hybrid hydraulic drive systems typically add power to conventional vehicle drive systems by utilizing the hydraulic energy stored in the hydraulic accumulators to drive the reversible pump/motor as a motor.

SUMMARY OF THE INVENTION

The present invention provides, in one aspect, an energy storage system for a hybrid vehicle including an internal combustion engine having an output shaft. The energy storage system includes a reservoir containing working fluid, a reversible pump/motor in fluid communication with the reservoir, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump. The energy storage system also includes an electric motor having a rotor selectively coupled to the output shaft to transfer torque to the output shaft. The reversible pump/motor is coupled to the rotor to transfer torque to the rotor when operating as a motor, and to receive torque from the rotor when operating as a pump.

The present invention provides, in another aspect, a method of operating a hybrid vehicle including an internal combustion engine having an output shaft. The method includes providing an accumulator containing working fluid and gas, coupling a reversible pump/motor to a rotor of an electric motor, selectively coupling the rotor to the output shaft, and delivering pressurized working fluid from the accumulator to the reversible pump/motor when operating as a motor to rotate the rotor and the output shaft to start the engine Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 3:
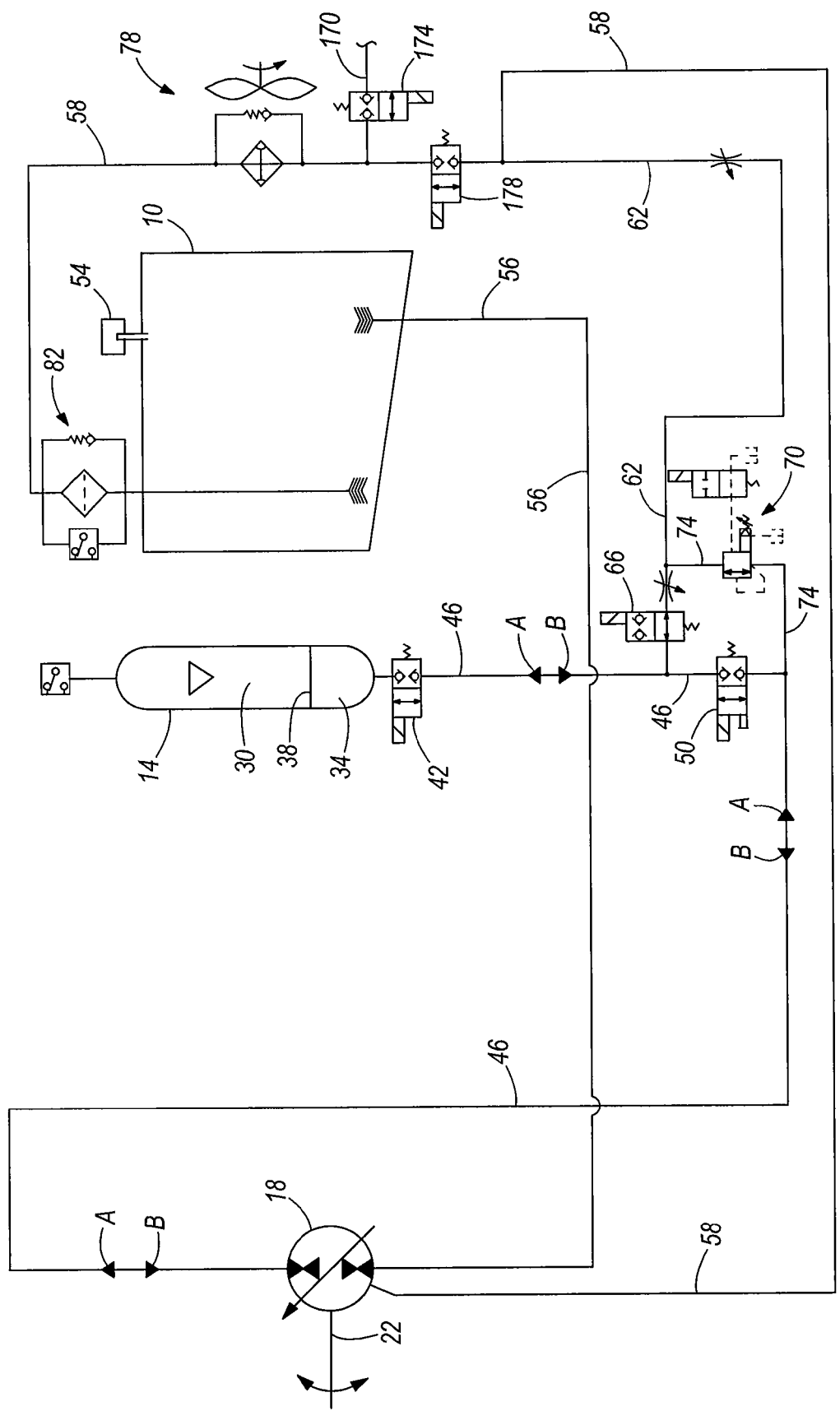
FIG. 3 is a schematic of a reservoir, a reversible pump/motor of the starter assembly, and a hydraulic accumulator of the energy storage system of the present invention.

FIG. 3 illustrates a schematic of a vehicle hybrid hydraulic drive system including a reservoir 10, an accumulator 14 in selective fluid communication with the reservoir 10, and a reversible pump/motor 18 operably coupled to the accumulator 14. The reversible pump/motor 18 is operably coupled to a driveline 22 of a vehicle 26 (see FIG. 1) to deliver power to the vehicle driveline 22 or to absorb power from the vehicle driveline 22, as explained in greater detail below. In the illustrated construction of the vehicle hybrid hydraulic drive system, the reversible pump/motor 18 is configured as a variable displacement pump/motor 18. Alternatively, the reversible pump/motor 18 may be configured having a constant displacement.

The vehicle 26 includes an internal combustion engine 27 having an output shaft 28 (e.g., a crankshaft) and a starter gear 29 (e.g., a flywheel or flex plate) coupled for co-rotation with the output shaft 28. The vehicle also includes a multi-speed transmission 31 (e.g., a planetary automatic transmission) and a torque converter 32 coupling the engine 27 to the transmission 31. Alternatively, the transmission 31 may be configured as a manual transmission. The vehicle 26 further includes an output shaft 33 coupling the transmission 31 and a rear differential 34 in the vehicle's driveline 22. A pair of rear wheels 35 is driven by the rear differential 34 in a conventional manner. Although not shown, a front differential in combination with a secondary gearbox (e.g., a four-wheel drive transfer case) may transfer power from the engine 27 to a pair of front wheels 36 of the vehicle 14.

With reference to FIG. 3, the accumulator 14 includes a first chamber 30 containing a gas (e.g. nitrogen, etc.), a second chamber 34 containing a working fluid (e.g. hydraulic fluid, etc.), and a movable piston 38 separating the chambers 30, 34 (schematically illustrated as a line between the chambers 30, 34). Alternatively, the accumulator 14 may be configured with a bladder or a diaphragm rather than the piston 38. The vehicle hybrid hydraulic drive system also includes an isolation valve 42 in fluid communication with the working fluid chamber 34 in the accumulator 14 by a fluid passageway. Alternatively, the isolation valve 42 may be mounted directly to an inlet/outlet port of the accumulator 14.

The isolation valve 42 is also in fluid communication with the reversible pump/motor 18 by a fluid passageway 46. Another isolation valve 50 is in fluid communication with the isolation valve 42 and the reversible pump/motor 18 and is situated in the fluid passageway 46 between the isolation valve 42 and the reversible pump/motor 18. Each of the isolation valves 42, 50 may be configured as a poppet valve, ball valve, spool valve, gate valve, cartridge valve, needle valve, block valve, etc. Further, each of the isolation valves 42, 50 is solenoid-actuated to open and spring-biased to close. Each of the isolation valves described below may be structurally and functionally similar to the isolation valves 42, 50. Further, each of the isolation valves described below, including isolation valves 42, 50, may be controlled by an engine control unit ("ECU") of the vehicle 26 or by a control unit that is separate and distinct from the ECU.

With reference to FIG. 3, the reservoir 10 contains working fluid and includes a breather 54. The breather 54 provides venting of the space above the working fluid in the reservoir 10 as the level of working fluid fluctuates during operation of the vehicle hybrid hydraulic drive system. The breather 54 is exposed to the atmosphere, such that gas in the reservoir 10 may be vented to the atmosphere, and replacement air may be allowed to enter the reservoir 10 when the level of working fluid in the reservoir 10 decreases. Alternatively, the breather 54 may be fluidly connected to an auxiliary tank or vessel (not shown) to contain gas vented from the reservoir 10. As a further alternative, the breather 54 may only allow replacement air to enter the reservoir 10 during operation of the vehicle hybrid hydraulic drive system to pressurize the reservoir 10.

The reservoir 10 is in fluid communication with the reversible pump/motor 18 by separate fluid passageways 56, 58. Another isolation valve 66 is situated in a fluid passageway 62 joining the fluid passageway 46 and the fluid passageway 58. In addition, a pressure relief valve 70 is in fluid communication with the reversible pump/motor 18 and the reservoir 10 and is situated in a fluid passageway 74 between the reversible pump/motor 18 and the reservoir 10. The fluid passageway 74 fluidly communicates the respective passageways 46, 62 when the pressure relief valve 70 is opened. A heat exchanger 78 and a working fluid filter 82 are in fluid communication with the reversible pump/motor 18 and the reservoir 10 and are each situated in the fluid passageway 58 between the reversible pump/motor 18 and the reservoir 10.

Figure 1:
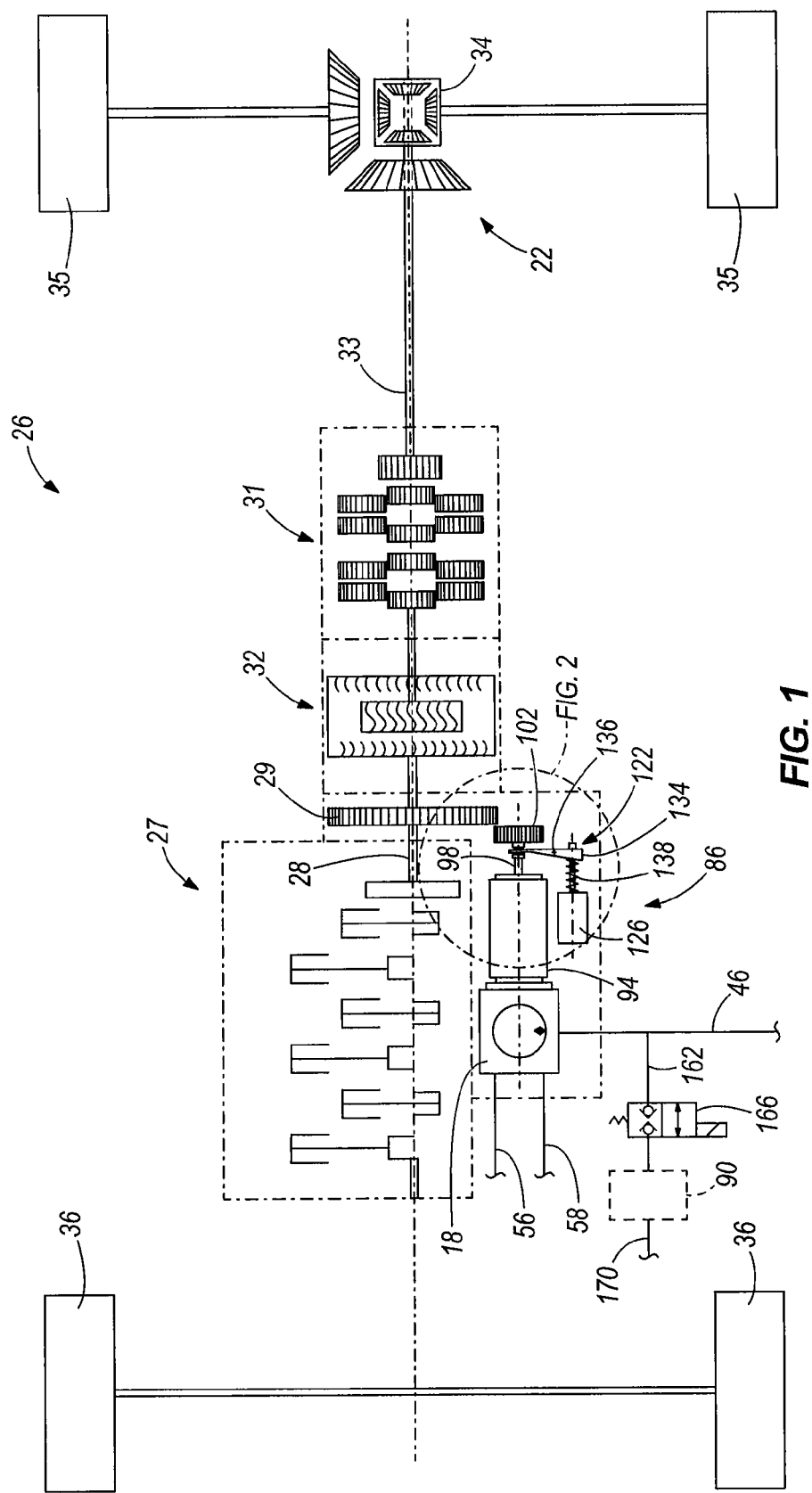
FIG. 1 is a schematic of a starter assembly and an internal combustion engine of an energy storage system of the present invention.

With reference to FIG. 1, the vehicle hybrid hydraulic drive system also includes a starter assembly 86 operable to receive pressurized working fluid from the accumulator 14 and deliver pressurized working fluid to the accumulator 14. As described in greater detail below, the starter assembly 86 is also operable to deliver pressurized working fluid to an auxiliary hydraulic system 90 of the vehicle 26. Such an auxiliary hydraulic system 90 may include, for example, a tailgate lift or hoist, a winch, or a hydraulic cylinder. Alternatively, the auxiliary hydraulic system 90 may include any of a number of different hydraulic components utilizing pressurized working fluid to perform work. Further, the starter assembly 86 is operable to deliver torque to the driveline 22 to power the vehicle 26.

With continued reference to FIG. 1, the starter assembly 86 includes an electric motor 94 having a rotor 98, a pinion 102 coupled to a first end of the rotor 98, and the reversible pump/motor 18 coupled (e.g., by a key and a keyway arrangement, a spline fit, etc.) to a second end of the rotor 98 opposite the pinion 102. The pinion 102 is axially slidable along the rotor 98 between a first position, in which the rotor 98 is disengaged from the starter gear 29, and a second position, in which the rotor 98 is engaged with the starter gear 29 (see FIG. 2). Any of a number of different structural connections between the pinion 102 and the rotor 98 may be employed to rotationally affix the pinion 102 to the rotor 98, yet allow the pinion 102 to slide along the rotor 98 to selectively engage the starter gear 29. For example, a key and keyway arrangement may be employed between the pinion 102 and the rotor 98. Alternatively, the pinion 102 may be slidable along a non-cylindrical portion of the rotor 98, with the pinion 102 including a corresponding non-cylindrical aperture through which the rotor 98 is received.

Figure 2:
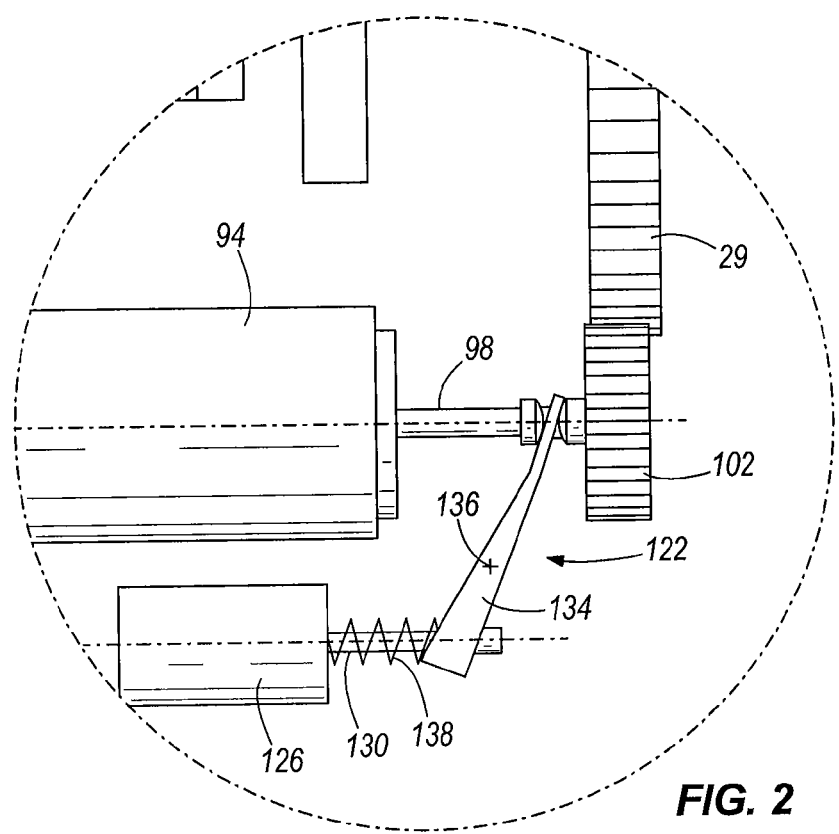
FIG. 2 is an enlarged view of the starter assembly of FIG. 1, illustrating a pinion of the starter assembly engaged to a starter gear of the internal combustion engine.

With reference to FIG. 1, the starter assembly 86 also includes a linkage 122 coupled to the pinion 102 and an electric solenoid 126 operable to actuate the linkage 122, causing the pinion 102 to move between its disengaged and engaged positions with the starter gear 29. As best shown in FIG. 2, the solenoid 126 includes a plunger 130 oriented substantially parallel with the rotor 98, and the linkage 122 includes a single lever 134 having a pivot 136 disposed between the rotor 98 and the plunger 130. The end of the lever 134 coupled to the pinion 102 may include a bearing to facilitate movement (e.g., rotation) of the rotor 98 and pinion 102 relative to the lever 134. Alternatively, the linkage 122 may include any of a number of different levers or links interconnecting the pinion 102 and the plunger 130 of the solenoid 126. The solenoid 126 includes a compression spring 138 positioned between the lever 134 and the body of the solenoid 126 to provide a biasing force against the end of the lever 134 coupled to the plunger 130.

Figure 2A:
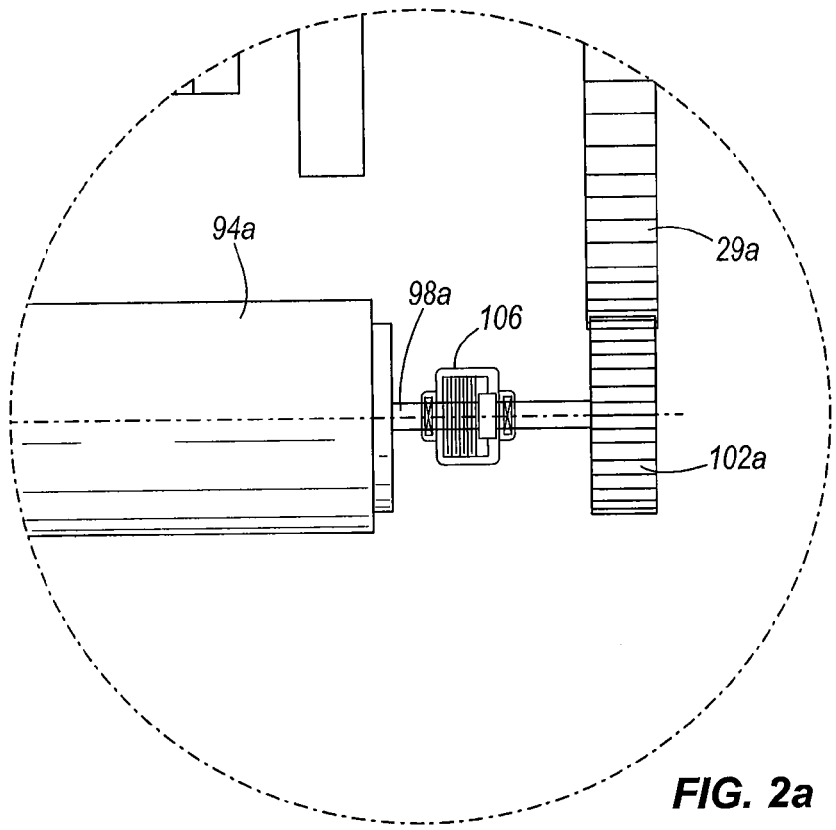
FIG. 2a is an enlarged view of a second construction of a starter assembly that may be incorporated in the energy storage system of the present invention, illustrating a clutch positioned between an electric motor and a pinion of the starter assembly.

With reference to FIG. 2a, a second construction of a starter assembly is shown, with like components having like reference numerals as the starter assembly 86 with the letter "a" added. The second construction of the starter assembly includes a clutch 106 selectively coupling the rotor 98a and the pinion 102a to transfer torque from the rotor 98a to the pinion 102a. The clutch 106 allows the pinion 102a to remain engaged with the starter gear 29a at all times. The clutch 106 may be configured as an electric clutch or an electromagnetic clutch operable to interface directly with the vehicle ECU or a control unit separate and distinct from the ECU, or the clutch 106 may be pneumatically or hydraulically actuated by the ECU or a separate control unit through an intermediate controller. Also, the ECU or separate control unit may control the degree of engagement of the clutch 106 (e.g., by controlling the amount of voltage or fluid pressure delivered to the clutch 106), such that a variable amount of torque may be transferred between the engine output shaft 28 and the reversible pump/motor 18 due to a controlled amount of slippage in the clutch 106.

With reference to FIGS. 1 and 3, when operating as a pump, the reversible pump/motor 18 is in fluid communication with the reservoir 10 via the fluid passageway 56. Also, when operating as a pump, the reversible pump/motor 18 is in selective fluid communication with at least one of the accumulator 14 and the auxiliary hydraulic system 90 of the vehicle 26 to deliver pressurized working fluid to the accumulator 14 and/or the auxiliary hydraulic system 90. As schematically shown in FIGS. 1 and 3, the reversible pump/motor 18 is in selective fluid communication with the accumulator 14 via the fluid passageway 46 and the isolation valves 42, 50, and the reversible pump/motor 18 is in selective fluid communication with the auxiliary hydraulic system 90 by another fluid passageway 162 and an isolation valve 166 positioned in the fluid passageway 162.

Further, downstream of the auxiliary hydraulic system 90, yet another fluid passageway 170 fluidly communicates the auxiliary hydraulic system 90 with the return fluid passageway 58 and the reservoir 10. An isolation valve 174 is positioned in the fluid passageway 170 between the auxiliary hydraulic system 90 and the return passageway 58, and another isolation valve 178 is positioned between the junction of the passageway 170 and the return passageway 58, and the junction between the respective passageways 58, 62. With continued reference to FIG. 3, when operating as a motor to start the engine 27 or deliver torque to the driveline 22, the reversible pump/motor 18 is in fluid communication with the fluid passageway 58 to return low-pressure working fluid to the reservoir 10, and when operating as a pump to power the auxiliary hydraulic system 90, the reversible pump/motor 18 is in fluid communication with the fluid passageways 58, 170 to return low-pressure working fluid to the reservoir 10. It should be understood that the reversible pump/motor 18 may be fluidly connected to the reservoir 10, the accumulator 14, and the auxiliary hydraulic system 90 in any of a number of different ways, including any of a number of fluid passageways and/or isolation valves in order to provide the below-described modes of operation.

With reference to FIG. 3, when the vehicle 26 undergoes braking or another operation where rotational energy (e.g., from the engine 27 or driveline 22) may be absorbed and stored, the reversible pump/motor 18 functions as a pump driven by the engine 27 or vehicle's axle or driveline 22. The reversible pump/motor 18 draws low-pressure working fluid from the reservoir 10 through the fluid passageway 56 and pressurizes the working fluid. The resultant high pressure working fluid exits the reversible pump/motor 18 and flows through the fluid passageway 46 (in the direction of arrow A), through the isolation valves 50, 42 and into the working fluid chamber 34 of the accumulator 14. With reference to FIG. 1, the isolation valve 166 in the fluid passageway 162 would be closed to prevent the pressurized working fluid from entering the auxiliary hydraulic system 90 of the vehicle 26. As the pressurized working fluid flows into the accumulator 14, the piston 28 is displaced upwardly, thereby compressing the gas in the gas chamber 30. The work performed by the piston 38 to compress the gas is stored for later use to power the driveline 22 or start the engine 27 as described below. To recover this lost energy, the pinion 102 must be engaged with the starter gear 29 (described in more detail below).

When the vehicle 26 undergoes acceleration or another operation where propulsion assistance is needed, the reversible pump/motor 18 functions as a motor. The compressed gas acts on the piston 38 in the accumulator 14, thereby maintaining the working fluid at a high pressure. Upon opening the isolation valves 42, 50, pressurized working fluid flows from the accumulator 14 in the direction of arrow B, through the fluid passageway 46 and into the reversible pump/motor 18 to drive the reversible pump/motor 18 and the driveline 22, thereby assisting the vehicle's acceleration or other energy-expending operation. The isolation valve 166 in the fluid passageway 162 would remain closed to prevent the discharge of high pressure working fluid to the auxiliary hydraulic system 90 of the vehicle 26. After being used by the pump/motor 18, low-pressure working fluid exits the reversible pump/motor 18, flows through the working fluid passageway 58, through the isolation valve 178, through the heat exchanger 78 and the filter 82 positioned in the fluid passageway 58, and is subsequently returned to the reservoir 10. To use the stored energy in the accumulator 14 in this manner, the pinion 102 must be engaged with the starter gear 29 (described in more detail below).

In a first mode of operation, the starter assembly 86 is operable to use the stored energy of the working fluid in the accumulator 14 to start the internal combustion engine 27. To implement this mode of operation, the solenoid 126 is first activated to retract the plunger 130 against the bias of the compression spring 138 to pivot the lever 134 in a clockwise direction about the pivot 136 (see FIG. 2), thereby causing the pinion 102 to engage the starter gear 29 of the engine 27. In this mode of operation, the solenoid 126 is activated separately from the motor 94. As such, the motor 94 will not operate to drive the rotor 98 subsequent to activation of the solenoid 126.

Then, the isolation valves 42, 50 in the fluid passageway 46 are opened, while the isolation valves 66, 166 remain closed. In a similar manner as described above, pressurized working fluid flows from the accumulator 14, through the fluid passageway 46, and into the reversible pump/motor 18 to operate the reversible pump/motor 18 as a motor to drive the rotor 98 and the pinion 102 to start the engine 27. Low-pressure working fluid then exits the reversible pump/motor 18, flows through the working fluid passageway 58, through the heat exchanger 78 and the filter 82 positioned in the fluid passageway 58, and is subsequently returned to the reservoir 10. After the engine 27 has started, the solenoid 126 is deactivated to allow the stored energy in the spring 138 to pivot the lever 134 in a counterclockwise direction about the pivot 136 to disengage the pinion 102 and the starter gear 29. Also, the isolation valves 42, 50 in the fluid passageway 46 is closed to isolate the reversible pump/motor 18 from the accumulator 14. To employ the second construction of the starter assembly shown in FIG. 2a in the first mode of operation, the clutch 106 is engaged separately from activation of the motor 94a. As such, the motor 94a will not operate to drive the rotor 98a subsequent to engagement of the clutch 106.

In a second mode of operation, the starter assembly 86 is operable to use electrical energy stored or generated by the vehicle 26 (e.g., in a battery) to operate the electric motor 94 to start the internal combustion engine 27. In this mode of operation, the isolation valves 42, 50 remain closed to isolate the reversible pump/motor 18 from the accumulator 14. Then, the solenoid 126 is activated to retract the plunger 130 against the bias of the compression spring 138 to pivot the lever 134 in a clockwise direction about the pivot 136 (see FIG. 2), thereby causing the pinion 102 to engage the starter gear 29 of the engine 27. The motor 94 is subsequently activated to drive the rotor 98 and the pinion 102 to start the engine 27. After the engine 27 has started, the solenoid 126 is deactivated to allow the stored energy in the spring 138 to pivot the lever 134 in a counterclockwise direction about the pivot 176 to disengage the pinion 102 and the starter gear 29. To employ the second construction of the starter assembly shown in FIG. 2a in the second mode of operation, the clutch 106 is engaged with the activation of the motor 94a to transfer torque from the motor 94a to the pinion 102a.

In a third mode of operation, the starter assembly 86 is operable to deliver pressurized working fluid to the working fluid chamber 34 of the accumulator 18 to pre-charge the accumulator 18. In this mode, the motor 94 is activated separately from the solenoid 126, such that the pinion 102 remains in its disengaged position shown in FIG. 1, to operate the reversible pump/motor 18 as a pump. The reversible pump/motor 18 draws working fluid from the reservoir 10 via the fluid passageway 56, pressurizes the working fluid, and discharges the pressurized working fluid through the fluid passageway 46, through the opened isolation valves 42, 50, and into the working fluid chamber 34 of the accumulator 14. As the pressurized working fluid flows into the accumulator 14, the piston 38 is displaced upwardly, thereby compressing the gas in the accumulator 14. The work performed by the piston 38 to compress the gas is stored for later use to power the axle or driveline 22, or to start the engine 27 as described above. To employ the second construction of the starter assembly shown in FIG. 2a in the third mode of operation, the clutch 106 remains disengaged during activation of the motor 94a. As such, the clutch 106 does not allow torque transfer between the rotor 98a and the pinion 102a.

Alternatively, in the third mode of operation, the starter assembly 86 is operable to deliver pressurized working fluid to the auxiliary hydraulic system 90 of the vehicle 26 to operate the auxiliary hydraulic system 90. In a similar manner as described above, the motor 94 is activated separately from the solenoid 126, such that the pinion 102 remains in its disengaged position shown in FIG. 1, to operate the reversible pump/motor 18 as a pump (the clutch 106 would remain disengaged in the second construction of the starter assembly shown in FIG. 2a). The isolation valve 166 in the fluid passageway 162 is opened to allow the reversible pump/motor 18 to draw working fluid from the reservoir 10, pressurize the working fluid, and discharge the pressurized working fluid through the fluid passageway 162 toward the auxiliary hydraulic system 90 for use. Low-pressure working fluid exits the auxiliary hydraulic system 90, flows through the working fluid passageway 170, through the isolation valve 174, through the heat exchanger 78 and the filter 82 positioned in the fluid passageway 58, and is subsequently returned to the reservoir 10.

Alternatively, in the third mode of operation, the starter assembly 86 may be operable to circulate working fluid through the heat exchanger 78 and the filter 82 to cool the working fluid and remove debris from the working fluid, respectively, without pumping the working fluid through the auxiliary hydraulic system 90. To implement this mode of operation in this manner, the isolation valves 42, 50 in the fluid passageway 46 and the isolation valve 174 in the fluid passageway 170 remain closed, and the isolation valve 178 in the fluid passageway 58 is opened to allow the reversible pump/motor 18 to draw working fluid from the reservoir 10, pressurize the working fluid, and discharge the pressurized working fluid through the fluid passageway 58 and through the heat exchanger 78 and the filter 82 positioned in the fluid passageway 58. The cooled and cleaned working fluid is then returned to the reservoir 10.

Various features of the invention are set forth in the following claims.

What is claimed is:

1. An energy storage system for a hybrid vehicle including an internal combustion engine having an output shaft, the energy storage system comprising:
    a reservoir containing working fluid;
    a reversible pump/motor in fluid communication with the reservoir;
    an accumulator containing working fluid and gas, the accumulator in selective fluid communication with the reversible pump/motor to deliver pressurized working fluid to the reversible pump/motor when operating as a motor, and to receive pressurized working fluid discharged by the reversible pump/motor when operating as a pump;
    an electric motor including a rotor selectively coupled to the output shaft to transfer torque to the output shaft;
    wherein the reversible pump/motor is coupled to the rotor to transfer torque to the rotor when operating as a motor, and to receive torque from the rotor when operating as a pump.

2. The energy storage system of claim 1, wherein the electric motor is a starter motor selectively operable to start the engine.

3. The energy storage system of claim 1, further comprising:
    a pinion coupled to the rotor to receive torque from the rotor; and
    a solenoid operable to move the pinion between a first position, in which the pinion is disengaged from a starter gear coupled to the output shaft, and a second position, in which the pinion is engaged with the starter gear.

4. The energy storage system of claim 1, wherein the accumulator is in selective fluid communication with the reversible pump/motor to deliver pressurized working fluid to the reversible pump/motor when operating as a motor to start the engine.

5. The energy storage system of claim 1, wherein the accumulator is in selective fluid communication with the reversible pump/motor to receive pressurized working fluid discharged by the reversible pump/motor when operating as a pump to pre-charge the accumulator.

6. The energy storage system of claim 5, wherein the electric motor is operable to drive the rotor to operate the reversible pump/motor as a pump to pre-charge the accumulator.

7. The energy storage system of claim 1, wherein the vehicle includes an auxiliary hydraulic system, and wherein the electric motor is operable to drive the rotor to operate the reversible pump/motor as a pump to provide pressurized working fluid to the auxiliary hydraulic system.

8. The energy storage system of claim 1, further comprising a heat exchanger in selective fluid communication with the reversible pump/motor, wherein the electric motor is operable to drive the rotor to operate the reversible pump/motor as a pump to circulate working fluid through the heat exchanger to cool the working fluid.

9. The energy storage system of claim 1, further comprising a filter in selective fluid communication with the reversible pump/motor, wherein the electric motor is operable to drive the rotor to operate the reversible pump/motor as a pump to circulate working fluid through the filter to remove debris from the working fluid.

10. The energy storage system of claim 1, further comprising a pinion coupled to the rotor adjacent a first end of the rotor, and wherein the reversible pump/motor is coupled to the rotor adjacent a second end of the rotor.

11. The energy storage system of claim 10, wherein the pinion is axially moveable along the rotor.

12. The energy storage system of claim 1, further comprising:
    a pinion coupled to the rotor to selectively receive torque from the rotor; and
    a clutch positioned between the rotor and the pinion.

13. A method of operating a hybrid vehicle including an internal combustion engine having an output shaft, the method comprising:
    providing a reservoir containing working fluid;
    providing an accumulator containing working fluid and gas;
    coupling a reversible pump/motor to a rotor of an electric motor, the reversible pump/motor in fluid communication with the reservoir and in selective fluid communication with the accumulator;
    selectively coupling the rotor to the output shaft;
    delivering pressurized working fluid from the accumulator to the reversible pump/motor when operating as a motor to transfer torque to and rotate the rotor and the output shaft to start the engine;
    pressurizing working fluid with the reversible pump/motor when operating as a pump using torque transferred to the reversible pump/motor from the rotor; and delivering pressurized working fluid from the reversible pump/motor to the accumulator.

14. The method of claim 13, wherein selectively coupling the rotor to the output shaft includes
coupling a pinion to the rotor; and
energizing a solenoid to engage the pinion and a starter gear coupled to the output shaft of the engine.

15. The method of claim 14, wherein energizing the solenoid includes separately energizing the solenoid from the electric motor.

16. The method of claim 13, further comprising engaging a clutch between the rotor and the output shaft to transfer torque between the rotor and the output shaft.

17. The method of claim 13, wherein delivering pressurized working fluid from the accumulator to the reversible pump/motor when operating as a motor to start the engine occurs in a first mode of operation, and wherein the method further includes, in a second mode of operation, blocking the flow of working fluid from the accumulator to the reversible pump/motor and energizing the electric motor to drive the rotor and the output shaft to start the engine.

18. The method of claim 17, further comprising, in a third mode of operation, decoupling the rotor from the output shaft and energizing the electric motor to drive the rotor and operate the reversible pump/motor as a pump.

19. The method of claim 18, further comprising delivering pressurized working fluid from the reversible pump/motor when operating as a pump to an auxiliary hydraulic system of the hybrid vehicle.

20. The method of claim 18, further comprising circulating pressurized working fluid from the reversible pump/motor when operating as a pump through a heat exchanger to cool the working fluid.

21. The method of claim 18, further comprising circulating pressurized working fluid from the reversible pump/motor when operating as a pump through a filter to remove debris from the working fluid.

22. The method of claim 18, wherein delivering pressurized working fluid from the reversible pump/motor when operating as a pump to the accumulator pre-charges the accumulator.

* * * * *